US012705216B2

(12) United States Patent
Noble et al.

(10) Patent No.: US 12,705,216 B2
(45) Date of Patent: Aug. 11, 2026

(54) STANDARDIZING A FILE FORMAT FOR QBM EXCHANGE AND INTEROPERABILITY

(71) Applicant: Dell Products L.P., Round Rock, TX (US)

(72) Inventors: Diego Vrague Noble, Pelotas (BR); Ítalo Gomes Santana, Rio de Janeiro (BR); Miguel Paredes Quiñones, Campinas (BR); Rômulo Teixeira de Abreu Pinho, Niterói (BR)

(73) Assignee: Dell Products L.P., Round Rock, TX (US)

( * ) Notice: Subject to any disclaimer, the term of this patent is extended or adjusted under 35 U.S.C. 154(b) by 30 days.

(21) Appl. No.: 18/420,601

(22) Filed: Jan. 23, 2024

(65) Prior Publication Data

US 2025/0238404 A1 Jul. 24, 2025

(51) Int. Cl.
*G06F 16/21* (2019.01)

(52) U.S. Cl.
CPC .................................. *G06F 16/211* (2019.01)

(58) Field of Classification Search
CPC ..................................................... G06F 16/211
See application file for complete search history.

(56) References Cited

U.S. PATENT DOCUMENTS

| | | | | |
|---|---|---|---|---|
| 7,734,617 | B2 * | 6/2010 | de Souza | G06Q 10/00 707/602 |
| 12,174,912 | B2 * | 12/2024 | De Carvalho, Jr. | G01C 21/343 |
| 12,373,720 | B1 * | 7/2025 | Cay | G06N 10/60 |
| 2022/0253504 | A1 * | 8/2022 | Mandal | G06F 17/16 |
| 2022/0262466 | A1 * | 8/2022 | Cloarec | G16H 10/40 |

FOREIGN PATENT DOCUMENTS

WO WO-2023195922 A1 * 10/2023

* cited by examiner

*Primary Examiner* — Brittany N Allen
(74) *Attorney, Agent, or Firm* — Workman Nydegger

(57) ABSTRACT

Techniques for implementing a standardized file container format for a QBM problem instance are disclosed. Initially, a QBM problem instance comprising a defined objective function is accessed. The QBM problem instance is compiled. A file is generated, and this file is structured in accordance with a standardized container file format. The standardized container file format defines one or more fields for compiled QBM problem instance data and one or more fields for QBM problem instance data. The file is populated by (i) populating the fields for the compiled QBM problem instance data with a composite data structure generated during the compilation process and (ii) populating the fields for the QBM problem instance data with metadata describing the composite data structure.

17 Claims, 4 Drawing Sheets

File Format Metadata
200

STANDARDIZING A FILE FORMAT FOR QBM EXCHANGE AND INTEROPERABILITY

FIELD OF THE INVENTION

Embodiments of the present invention generally relate to generating a standardized file container format. More particularly, at least some embodiments of the invention relate to systems, hardware, software, computer-readable media, and methods for implementing a standardized container format for a quadratic binary model so that the problem instance for the quadratic binary model can be processed by any type of vendor quantum annealer.

BACKGROUND

A container file format is a file format that packages and encapsulates different types of data along with metadata into a single file. They are popular in multimedia applications (e.g., video) in formats such as AVI, MPEG-4, and MKV, where a data stream is encoded or decoded using algorithms known as "codecs."

For example, an MKV container simultaneously encodes visual, audio, and subtitles as well as the metadata regarding which codecs (e.g., h265, mp3, etc.) were used in each data type. As a result, container file formats provide a convenient way to store, compress, and transmit data while ensuring compatibility across different devices and software applications. Additionally, a container file format can also provision tools to handle cryptography, data integrity (checksum), and data authenticity.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered limiting of its scope, embodiments of the invention will be described and explained with additional specificity and detail through the use of the accompanying drawings.

DETAILED DESCRIPTION OF SOME EXAMPLE EMBODIMENTS

Figure 1:
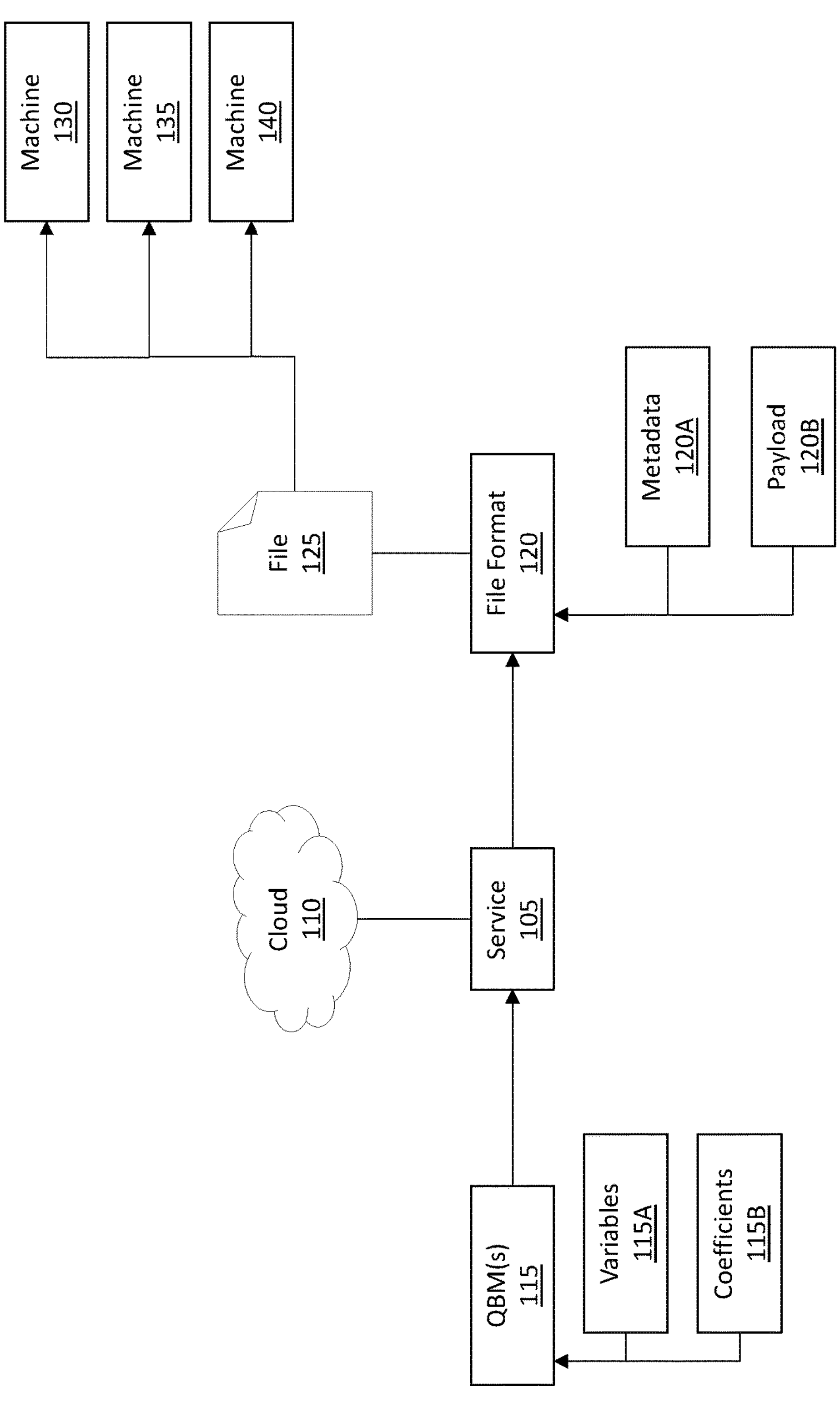
FIG. 1 illustrates an example computing architecture for implementing a standardized file container format for quadratic binary models.

In the realm of Quantum Annealers (QAs), Quadratic Binary Models (QBMs) are a general class of problem models used by QA devices to sample solutions for a given problem. In practice, most QBMs are encoded to "Quadratic Unconstrained Binary Optimization" (QUBO) or "Ising" models. Once a given problem is formally presented as a QBM (e.g., QUBO, Ising, etc.), a compilation step carried out on classical machines is performed to consolidate all information of the defined objective function, constraints, variables, and their coefficients into a composite structure (e.g., a matrix) that is convenient for running on QAs.

Unlike the codecs used for multimedia applications, traditionally, there has not been a standardized container file format designed to store problem instances compiled into QUBOs or Ising models. Although JSON files (or similar formats) can be made to hold metadata, there historically has not been a standard for QBM data, resulting in poor or no interchangeability between QBM models. Even further, with traditional techniques, it has been unworkable to guarantee the correctness, secrecy, and identity validation of QBM data that was stored or transmitted.

Stated differently, historically, there is no optimized file format to store and transmit QBMs in the form of QUBO or Ising models. After compilation, these models have historically been carelessly stored in plain-text files such as JSON or CSV files, resulting in high demand of network usage and storage resources. Also, traditionally, each JSON or CSV file was designed specifically for a certain QA vendor as opposed to being interchangeable with multiple different QA vendors tasked with solving the QBM problem.

One traditional format that has been used, though not very well, is the LP file format. The LP file format is one standard encoding technique used to represent optimization problems compatible with commercial solvers, such as Gurobi and CPLEX. Another traditional format is the .qubo file format, which is from D-Wave Systems' qbsolv module. Although the LP and .qubo file formats can be used to encode QUBOs, they do not support features like cryptography, validation, and compression.

Because of the above deficiencies, there has been a significant increase in potential security and privacy issues. The disclosed embodiments are beneficially directed to a new type of file format suitable for operation with different types of QA vendors due to the standardization presented herein. In particular, this new type of file format is able to store both compiled (QUBO or Ising) problem data as payload and associated data from QBM instance problem as header. As another benefit, the disclosed embodiments have a strong focus on interoperability.

By providing a new, standard file format, which is specifically tailored to QBM models for QAs, the disclosed embodiments facilitate and promote interoperability among disparate QA vendors, thereby leading to a new standard that is optimized for storage and that is optimized for privacy. As a result, the disclosed embodiments provide significant benefits, advantages, and practical applications over the traditional technology.

Example Architecture

Attention will now be directed to FIG. 1, which illustrates an example architecture 100 in which the disclosed principles may be employed. Architecture 100 shows a service 105.

As used herein, the term "service" refers to an automated program that is tasked with performing different actions based on input. In some cases, service 105 can be a deterministic service that operates fully given a set of inputs and without a randomization factor. In other cases, service 105 can be or can include a machine learning (ML) or artificial intelligence engine. The ML engine enables service 105 to operate even when faced with a randomization factor.

As used herein, reference to any type of machine learning or artificial intelligence may include any type of machine learning algorithm or device, convolutional neural network(s), multilayer neural network(s), recursive neural network(s), deep neural network(s), decision tree model(s) (e.g., decision trees, random forests, and gradient boosted trees) linear regression model(s), logistic regression model(s), support vector machine(s) ("SVM"), artificial intelligence device(s), or any other type of intelligent computing system. Any amount of training data may be used (and perhaps later refined) to train the machine learning algorithm to dynamically perform the disclosed operations.

In some implementations, service 105 is a cloud service operating in a cloud environment 110. In some implementations, service 105 is a local service operating on a local device. In some implementations, service 105 is a hybrid service that includes a cloud component operating in the cloud and a local component operating on a local device. These two components can communicate with one another.

Service 105 is able to access one or more QBM(s) 115, or rather, QMB instance data, which includes one or more variables 115A and coefficients 115B. In some cases, the data for the QBM(s) 115 can be compiled by service 105 in a manner so that it is organized in a symmetrical matrix format. This symmetrical matrix format can optionally be stored using a dictionary having coordinate pairs with floating point values that represent cells of the matrix. Using this symmetrical matrix format, a complex optimization problem can be translated into a more workable matrix format. The matrix can be solved by a QA vendor and then transformed back to the QBM's original domain.

A Quadratic Unconstrained Binary Optimization Problem is a special kind of optimization problem that is amenable to be represented and solved through unconstrained quadratic binary variables. Not all optimization problems are of this kind. For instance, the Traveling Salesman Problem (TSP) can be modelled as a Quadratic Unconstrained Binary Optimization Problem. This problem has a specific set of equations that describe how it is intended to be solved. An instance to TSP is a valid configuration of city coordinates in a Cartesian space (e.g., a coordinate pair (x,y) for the position of each city in a 2D space). Other problem settings may include different equations to represent their instances. In general terms, the compilation process assembles the equations of a particular problem instance into a composite data structure, usually a matrix, which is the compiled QBM data.

Often, the entity that solves the above matrix problem might be a different entity than the one that originally compiled the problem into the matrix format. Thus, the "problem" might be delivered to a different machine or node to be operated on. To facilitate the efficient transmission of the problem data (and to enable the use of an interchangeable format), service 105 encapsulates the variables 115A and coefficients 115B with additional metadata (e.g., as shown by metadata 120A), thereby forming a new file format 120. The encapsulated data (e.g., the variables 115A, coefficients 115B, and metadata 120A) is placed in a header at the beginning of a file 125 having the file format 120. The file format 120 is also structured to accommodate a payload 120B. Thus, the resulting file 125 that includes the metadata 120A (e.g., the descriptive data for the QBM matrix instance problem) and the payload 120B (e.g., the QBM matrix instance problem itself) is organized using the file format 120.

Some of the metadata 120A is structured to also include instructions on how to go about using the payload 120B (i.e. the matrix instance problem) as well as potentially how to go about using various portions of the metadata 120A (e.g., perhaps for privacy preservation purposes). Thus, the metadata 120A can include usage information on how the content in the file 125 can be used. In some cases, the payload 120B (e.g., the matrix) can optionally be compressed in an effort to reduce the size of the file 125.

In this sense, the embodiments are directed to the generation of a new file format for persistently storing or allowing the storage of that problem instance in the form of the matrix. This data can be stored using the disclosed file format in a structured manner that is interoperable with whatever node might be subsequently tasked with solving the problem instance (i.e. solving the matrix). By structuring the file 125 to use the file format 120, the data in the file 125 can be transmitted to any number or type of QA vendors, as shown by machines 130, 135, and 140, each of which might implement a different QA application.

By way of further detail, in applications where QBMs are exchanged among machines (e.g., a QBM problem is firstly compiled in machine A to generate a QUBO then moved to a pool of jobs waiting for their submission in machine B, such as machines 130, 135, or 140), a preceding collective agreement is typically performed. This agreement is usually done in the form of a standard. The disclosed embodiments are directed to a new, interoperable file format standard that facilitates the exchange between different machines, thereby promoting the objective of improved interoperability. In addition to this interoperability benefit, the disclosed standard file format can also help in topics regarding QBM's confidentiality, correctness, and even lifelong learning scenarios where metadata can be used to train forthcoming artificial intelligence (AI) systems.

Figure 2:
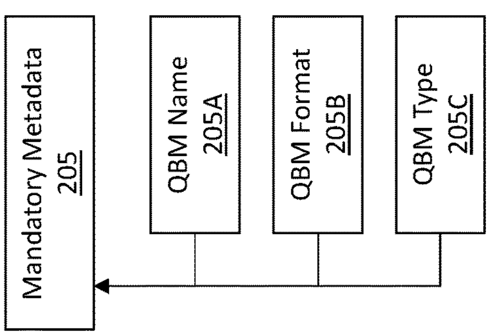
FIG. 2 illustrates various different parts of metadata that can be included in the standardized file container format.
Figure 2:
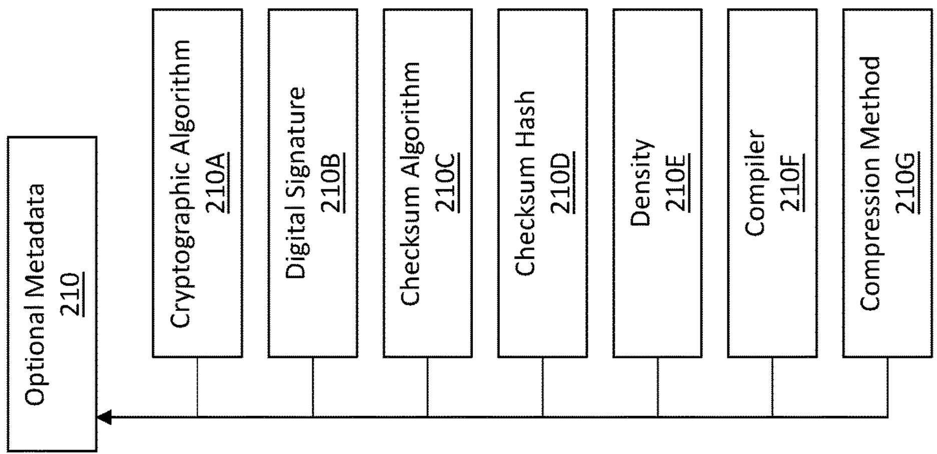

The disclosed file format standard (e.g., file format 120) encapsulates the QBM variables and coefficients together with additional metadata, which is placed in the header at the beginning of the file 125. This metadata is of two types: mandatory and optional. FIG. 2 provides additional details.

In particular, FIG. 2 shows file format metadata 200, which is representative of the metadata 120A from FIG. 1 and which is included as a part of the file format 120 in FIG. 1. The file format metadata 200 includes at least two different types of metadata, including mandatory metadata 205 and optional metadata 210.

Mandatory metadata 205 includes a number of parameters. One parameter is a QBM Name 205A, which is the name of the instance or QBM file used to identify it. Another parameter is a QBM Format 205B, which is a compatible regular expression (regex) (e.g., optionally in Python) describing the format of the compiled QBM.

A possible regex for QUBOs is the following: r'{(\([^,] *,\s?[^,:] *\)): \s?([^,] *)}?'. This regex matches all QUBOs that start with '{' and contain pairs of elements where the first element is a tuple of names separated by commas while the second element comes after a colon and is followed by '}' or not. By way of further detail, the first element is a tuple of two elements/qubits, or simply a pair of qubits (e.g., (x1,x2)). The second element is the coefficient (e.g., 3.14) that corresponds to its pair of qubits. In this example, the resulting form is (x1,x2): 3.14, where the pair of elements (qubit pair and coefficient-first level) is separated by ":" while the qubit pair (first and second qubits of the pair) is separated by a comma. Moreover, each qubit pair and its coefficient is separated by a comma to the next qubit pair and its coefficient.

A valid example is "{(x1,x2): 1, (x1,x3): 2, (x2,x3): 3}". This field adds a syntax rule that is going to be used by the parser that will reconstruct the QUBO. This way, the decoder that will read the file will not have to guess or infer the QBM's syntactical structure.

Regex inferring and learning is a costly computational problem. Other QBMs, such as constrained formats for instance, often require specific syntactical structure to hold information about that kind of constraint (linear, quadratic, equality, inequality, etc.). By including the QBM format 205B in the mandatory metadata 205, improvements in inferring and learning can be achieved.

Another parameter is a QBM Type 205C, which is a numeric value that describes the type for the QBM. As one example, zero can be used for QUBOs, one can be used for Ising Models, and so on.

Optional metadata 210 includes (but is not limited to) a number of parameters. One parameter is a cryptographic algorithm 210A. The cryptographic algorithm can be used for symmetric cryptography. This means that the receiver must have the same secret key to use during encryption to decipher the QBM information. This portion of the metadata can hold a label such as AES, or DES, for instance, to indicate the employed algorithm. Optionally, one could add a new parameter carrying a Message Authentication Code (MAC) for improved integrity check in addition to encryption when transmitting messages over an insecure channel.

Another parameter is a digital signature 210B using an asymmetric public-key cryptosystem. This option is intended for encryption, authentication, and digital signing purposes. A receiver can check this signature with the sender's key to authenticate that the QBM information was not tampered with before, during, or after transmission. This field can hold a label such as RSA, for instance. This is an asymmetric alternative to 210A.

Another parameter is a checksum algorithm 210C. In some implementations, the algorithm used to generate the checksum is a hash. This field can hold a label such as SHA-256 and is used for correctness verification purposes.

Another parameter is a checksum hash 210D. This parameter represents the hash code for the QBM checksum generated by the checksum algorithm 210C.

Another parameter is matrix density 210E, which refers to the density of the QBM. This information can be a numeric value in the range of [0.0, 1.0] and can portray a percentage of variable pairs used in relation to the maximum number of pairs possible. This term can also stand for variable pairs with non-negative values for Ising models and non-zero values for QUBO models.

Another parameter is a compiler 210F, which refers to the compiler used to generate the QBM. A possible value is PyQubo, which is an open-source tool used for modelling and compiling QUBO problems.

Another parameter is a compression method 210G, which refers to a label representing the algorithm to compress QBM data. Some optional values for this parameter include LZMA, BZip2, or any other proprietary compressor.

Returning to FIG. 1, the file format 120 can optionally be built on top of a preexisting format such as BSON (Binary JSON) whose schema can be used in QBMs. Stated differently, the BSON file schema can be used to declare the file format type disclosed herein.

For instance, the BSON file schema can be used to declare the parameter fields for the metadata and can also be used to declare the field for the payload. When the BSON file schema is used, the resulting data in the file 125 is binary data (i.e. the file 125 is a binary file). Thus, the content of the file 125 is different than the traditional CSV files that were used in the past. A binary data extractor can be used by the receiving node to extract and translate the binary data into human-readable data.

Such an approach has the advantage of leveraging already existing and mature tools to create, read, and manipulate BSON files. Of course, other defining schemas could be used as well. For instance, another tool, referred to as a "protocol buffer," can be used as an alternative to the BSON schema. Thus, the embodiments are agnostic with regard to whatever schema is used.

As shown in FIG. 1, after the file 125 is created, service 105 can optionally transmit the file 125 to any number of machines (e.g., machine 130, machine 135, or machine 140) to process the QBM data. Thus, the matrix (e.g., the payload 120B) and the metadata 120A can be stored or can be transmitted to another node/machine. Notably, the matrix by itself is not sufficient for the receiving node to know how to solve the matrix; instead, the receiving node will use both the payload 120B (i.e. the matrix) and the metadata 120A in order to solve the matrix problem. Thus, the metadata 120A provides context on how to solve the problem included in the payload 120B.

Inasmuch as some of the metadata can include privacy preserving data (e.g., the hash data mentioned earlier), the embodiments are able to facilitate an authentication or verification that the data received by the receiving node is the same as the data that was sent by the sending node. For instance, the receiving node can compute a hash on the received file and then compare it against the hash that was stored in the received file (particularly in the metadata). If the two hashes are the same, then the file has not been tampered with (e.g., if there is MAC parameter, but perhaps not so for checksum hashes whose objective is to guarantee some form of correctness such as no bit or set of bits was flipped accidentally during transmission or storage). Doing so provides a level of authentication guarantee for the recipient node.

In some implementations, a single QBM problem might be used, but different input values may be entered into the QBM problem. In such a scenario, the data describing how to read and interpret the QBM problem might be the same even though different input data is being used. In such scenarios, batching techniques can beneficially be used.

For instance, consider a single QBM problem that has multiple different input values. Some embodiments might structure a single file to include multiple different matrices (e.g., one for each set of input values) while having a single set of instructions (in the metadata) on how those multiple matrices are to be interpreted. In this scenario, all the matrices will be interpreted in the same manner, though the outputs will be different due to the different inputs that are being used. That is, all of the matrices in the same file (in this scenario) obey the same set of instructions, and those instructions need only be recited a single time.

Thus, in some embodiments, a single problem instance is mapped to a single file, and that single file may include any number of matrices with corresponding input. Those multiple different matrices, which all correspond to the same problem instance, can be included in the same single file that was mapped to the problem instance.

Other embodiments might restrict a single file to having a single problem matrix, even though multiple matrices correspond to the same QBM problem (they just have different inputs). In scenarios where a single file is restricted to storing a single matrix, some embodiments employ batched transmission of these files. Furthermore, some embodiments might configure only a single file to include the metadata instructions on how the matrices are to be used. These multiple files would all then be sent to the same node, and that node would extract the instructions from the one file and use those instructions for the other files. In some scenarios, the metadata might indicate that the included instructions are usable for one or more other designated files and/or one or more additional matrices. An example will be helpful.

Suppose service 105 of FIG. 1 generates three files (e.g., File A, File B, and File C), with each file being associated with the same QBM problem but each file is using different inputs. Service 105 may configure File A to include metadata instructions on how the matrix in File A is to be operated on. The metadata may further include an indication that these same instructions are applicable to the matrix in File B and to the matrix in File C. Service 105 may then purposefully omit those instructions in the metadata for File B and File C. Thus, the metadata in File A may be useable for the payloads of Files B and C.

In some scenarios, different QBM problem instances can optionally be mapped to the same file. For instance, consider the following scenario. In this scenario, there is a first QBM problem instance and a second QBM problem instance. The first QBM problem instance is translated to a first matrix with corresponding metadata, and the second QBM problem instance is translated to a second matrix with different corresponding metadata. Some embodiments are able to package all of that data (i.e. the two different matrices and the two different metadata) in the same file and transmit that file. Often (though not necessarily, as described above), each problem instance is mapped to its own corresponding file.

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 3:
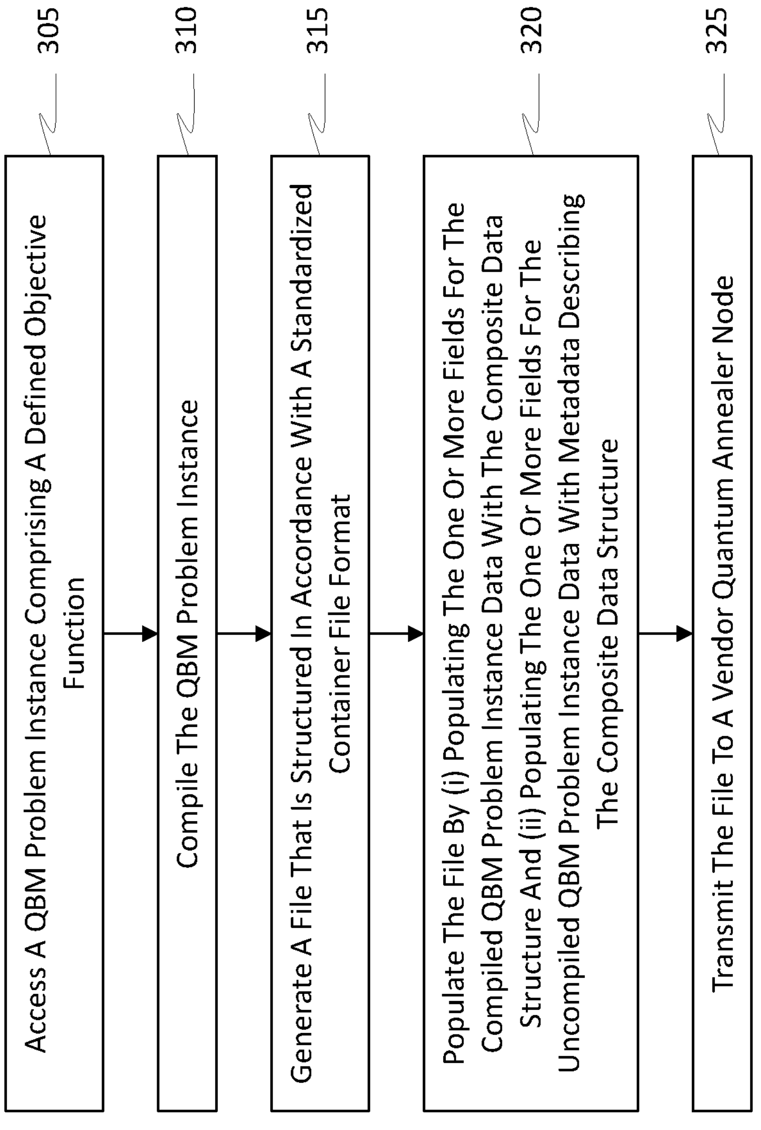
FIG. 3 illustrates a flowchart of an example method for implementing the standardized file container format.

Attention will now be directed to FIG. 3, which illustrates a flowchart of an example method 300 for implementing the use of a new standardized file container format that enables a QBM problem instance to be transmitted and to be usable by any number of different types of QA vendors. Method 300 can be implemented within the architecture 100 of FIG. 1; further, method 300 can be performed by service 105 of FIG. 1.

Method 300 includes an act (act 305) of accessing a quadratic binary model (QBM) problem instance. This QBM problem instance includes a defined objective function.

Act 310 includes compiling the QBM problem instance. This compilation results in the consolidation of the following data into a composite data structure: (i) the defined objective function, (ii) a constraint for the QBM problem instance defined by the objective function, (iii) a variable for the QBM problem instance defined by the objective function, and (iv) a coefficient for the variable of the defined objective function. Of course, multiple constraints, variables, and coefficients may be generated from the compilation step.

In some implementations, the composite data structure is a single matrix, such as the ones discussed previously. Optionally, the QBM problem instance can be compiled into a quadratic unconstrained binary optimization (QUBO) model or into an Ising model.

Act 315 includes generating a file. This file is structured in accordance with a standardized container file format (i.e. the standardized format described herein). The standardized container file format defines one or more fields for compiled QBM problem instance data (e.g., the matrix) and one or more fields for QBM problem instance data (e.g., the metadata). Optionally, the standardized container file format may be defined using a Binary Javascript Object Notation (BSON) schema.

In some implementations, the metadata (e.g., the QBM problem instance data) includes mandatory metadata and optional metadata. The mandatory metadata may include one, some, or all of the following: a field for a QBM name, a field for a QBM format, or a field for a QBM type.

In some implementations, the optional metadata includes one, some, or all of the following: a field for a cryptographic algorithm, a field for a digital signature using an asymmetric public-key cryptosystem, a field for a checksum algorithm, a field for a checksum hash, a field for matrix density data, a field for compiler data, or a field for a compression method.

Act 320 includes populating the file. This population is performed by (i) populating the one or more fields for the compiled QBM problem instance data with the composite data structure (e.g., the matrix) and (ii) populating the one or more fields for the QBM problem instance data with metadata (e.g., the mandatory and/or the optional metadata) describing the composite data structure.

Act 325 then includes transmitting the file to a vendor QA node (e.g., any one or more of machines 130, 135, or 140 in FIG. 1). Optionally, the file may be transmitted to multiple vendor QA nodes for parallel processing. The vendor QA node that returns a result the fastest may have its result used.

Because the standardized file container format is used, the file can be transmitted to any type of vendor QA node. Stated differently, the standardized container file format of the file enables the file to be processed by multiple different types of vendor quantum annealers.

By performing the disclosed operations, a standardized file format for QBM problem data can now be used. Use of this file format enables the QBM problem to be stored and transmitted in a more flexible manner.

Example Computer Systems

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. Also, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, client, engine, agent, services, and component are examples of terms that may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 4:
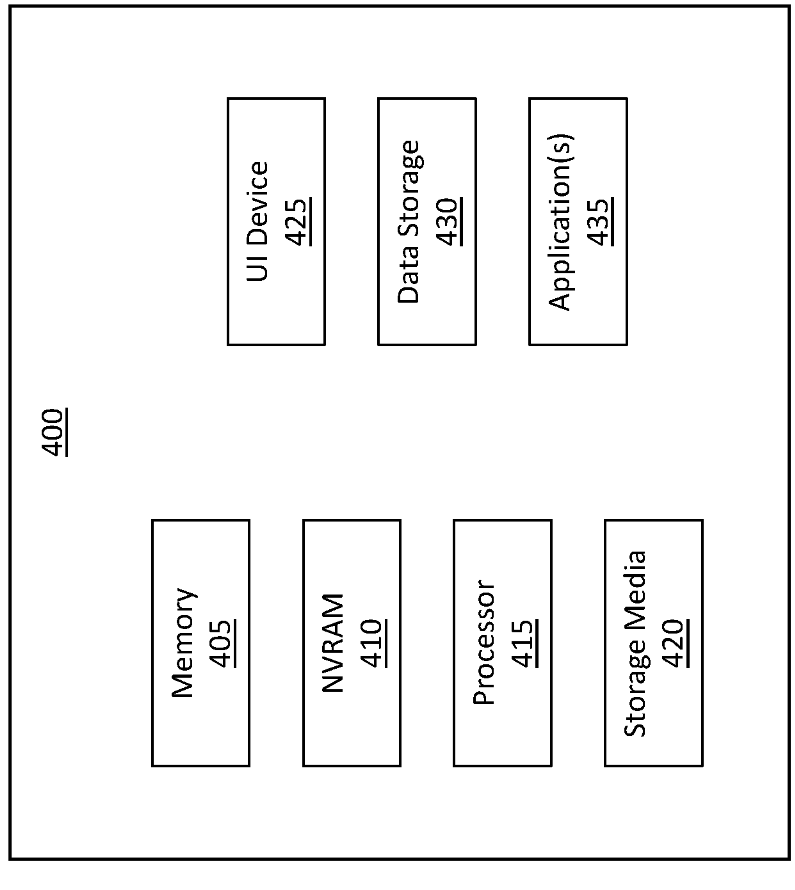
FIG. 4 illustrates an example computer system that can be configured to perform any of the disclosed operations.

With reference briefly now to FIG. 4, any one or more of the entities disclosed, or implied, by the Figures and/or elsewhere herein, may take the form of, or include, or be implemented on, or hosted by, a physical computing device, one example of which is denoted at 400. Also, where any of the aforementioned elements comprise or consist of a virtual machine (VM), that VM may constitute a virtualization of any combination of the physical components disclosed in FIG. 4.

In the example of FIG. 4, the physical computing device 400 includes a memory 405 which may include one, some, or all, of random access memory (RAM), non-volatile memory (NVM) 410 such as NVRAM for example, read-only memory (ROM), and persistent memory, one or more hardware processors 415, non-transitory storage media 420, UI device 425, and data storage 430. One or more of the memory 405 of the physical computing device 400 may take the form of solid-state device (SSD) storage. Also, one or more applications 435 may be provided that comprise instructions executable by one or more hardware processors 415 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The physical device 400 may also be representative of an edge system, a cloud-based system, a datacenter or portion thereof, or other system or entity.

The disclosed embodiments can be implemented in numerous different ways, as described in the various different clauses recited below.

Clause 1. A method comprising: accessing a quadratic binary model (QBM) problem instance comprising a defined objective function; compiling the QBM problem instance, resulting in consolidation of the following into a composite data structure: (i) the defined objective function, (ii) a constraint for the QBM problem instance defined by the objective function, (iii) a variable for the QBM problem instance defined by the objective function, and (iv) a coefficient for the variable of the defined objective function; generating a file that is structured in accordance with a standardized container file format, wherein the standardized container file format defines one or more fields for compiled QBM problem instance data and one or more fields for QBM problem instance data; and populating the file by (i) populating the one or more fields for the compiled QBM problem instance data with the composite data structure and (ii) populating the one or more fields for the QBM problem instance data with metadata describing the composite data structure.

Clause 2. The method of any of the preceding clauses, wherein the composite data structure is a single matrix.

Clause 3. The method of any of the preceding clauses, wherein the standardized container file format of the file enables the file to be processed by multiple different types of vendor quantum annealers.

Clause 4. The method of any of the preceding clauses, wherein the QBM problem instance is compiled into a quadratic unconstrained binary optimization (QUBO) model or an Ising model.

Clause 5. The method of any of the preceding clauses, wherein the standardized container file format is defined using a Binary JavaScript Object Notation (BSON) schema.

Clause 6. The method of any of the preceding clauses, wherein the metadata includes mandatory metadata and optional metadata.

Clause 7. The method of any of the preceding clauses, wherein the mandatory metadata includes a field for a QBM name.

Clause 8. The method of any of the preceding clauses, wherein the mandatory metadata includes a field for a QBM format.

Clause 9. The method of any of the preceding clauses, wherein the mandatory metadata includes a field for a QBM type.

Clause 10. The method of any of the preceding clauses, wherein the optional metadata includes a field for a cryptographic algorithm.

Clause 11. The method of any of the preceding clauses, wherein the optional metadata includes a field for a digital signature.

Clause 12. The method of any of the preceding clauses, wherein the optional metadata includes a field for a checksum algorithm.

Clause 13. The method of any of the preceding clauses, wherein the optional metadata includes a field for a checksum hash.

Clause 14. The method of any of the preceding clauses, wherein the optional metadata includes a field for density data.

Clause 15. The method of any of the preceding clauses, wherein the optional metadata includes a field for compiler data.

Clause 16. The method of any of the preceding clauses, wherein the optional metadata includes a field for a compression method.

Clause 17. The method of any of the preceding clauses, wherein the mandatory metadata includes a corresponding field for all of a QBM name, a QBM format, and a QBM type, and wherein the optional metadata includes a corresponding field for a cryptographic algorithm, a digital signature, a checksum algorithm, a checksum hash, a density value, a compiler data, and a compression method.

Clause 18. One or more hardware storage devices that store instructions that are executable by one or more processors of a computer system to cause the computer system to: access a quadratic binary model (QBM) problem instance comprising a defined objective function; compile the QBM problem instance, resulting in consolidation of the following into a composite data structure: (i) the defined objective function, (ii) a constraint for the QBM problem instance defined by the objective function, (iii) a variable for the QBM problem instance defined by the objective function, and (iv) a coefficient for the variable of the defined objective function; generate a file that is structured in accordance with a standardized container file format, wherein the standardized container file format defines one or more fields for compiled QBM problem instance data and one or more fields for QBM problem instance data; populate the file by (i) populating the one or more fields for the compiled QBM problem instance data with the composite data structure and (ii) populating the one or more fields for the QBM problem instance data with metadata describing the composite data structure; and transmit the file to a vendor quantum annealer node.

Clause 19. The one or more hardware storage devices of any of the preceding clauses, wherein the composite data structure is a matrix.

Clause 20. A computer system comprising: one or more processors; and one or more hardware storage devices that store instructions that are executable by the one or more processors to cause the computer system to: access a quadratic binary model (QBM) problem instance comprising a defined objective function; compile the QBM problem instance, resulting in consolidation of the following into a composite data structure: (i) the defined objective function, (ii) a constraint for the QBM problem instance defined by the objective function, (iii) a variable for the QBM problem instance defined by the objective function, and (iv) a coefficient for the variable of the defined objective function; generate a file that is structured in accordance with a standardized container file format, wherein the standardized container file format defines one or more fields for compiled QBM problem instance data and one or more fields for QBM problem instance data; populate the file by (i) populating the one or more fields for the compiled QBM problem instance data with the composite data structure and (ii) populating the one or more fields for the QBM problem instance data with metadata describing the composite data structure; and transmit the file to a vendor quantum annealer node.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:

accessing a quadratic binary model (QBM) problem instance comprising a defined objective function;

compiling the QBM problem instance, resulting in consolidation of the following into a composite data structure: (i) the defined objective function, (ii) a constraint for the QBM problem instance defined by the objective function, (iii) a variable for the QBM problem instance defined by the objective function, and (iv) a coefficient for the variable of the defined objective function, wherein the composite data structure is a single symmetric matrix;

generating a file that is structured in accordance with a standardized container file format, wherein the standardized container file format is structured to accommodate a payload, which includes the single symmetric matrix, and wherein the standardized container file format defines a schema that specifies one or more fields for compiled QBM problem instance data, one or more fields for QBM problem instance data, and fields for metadata describing how the payload is to be parsed and interpreted, such that the file is structured, in accordance with the standardized container file format, to include the metadata and the payload and such that the metadata within the file provides context on how to solve the QBM problem instance that is described in the payload; and populating the file by (i) populating the one or more fields for the compiled QBM problem instance data with the composite data structure, (ii) populating the one or more fields for the QBM problem instance data with metadata describing the composite data structure, (iii) the payload, and (iv) the metadata.

2. The method of claim 1, wherein the standardized container file format of the file enables the file to be processed by multiple different types of vendor quantum annealer devices.

3. The method of claim 1, wherein the QBM problem instance is compiled into a quadratic unconstrained binary optimization (QUBO) model or an Ising model.

4. The method of claim 1, wherein the standardized container file format is defined using a Binary JavaScript Object Notation (BSON) schema.

5. The method of claim 1, wherein populating the file to include the metadata includes populating the file to include a field for a QBM name.

6. The method of claim 1, wherein populating the file to include the metadata includes populating the file to include a field for a QBM format.

7. The method of claim 1, wherein populating the file to include the metadata includes populating the file to include a field for a QBM type.

8. The method of claim 1, wherein populating the file to include the metadata includes populating the file to include a field for a symmetric cryptographic algorithm.

9. The method of claim 1, wherein populating the file to include the metadata includes populating the file to include a field for a digital signature using an asymmetric public-key cryptosystem.

10. The method of claim 1, wherein the optional metadata includes-populating the file to include the metadata includes populating the file to include a field for a checksum algorithm.

11. The method of claim 1, wherein populating the file to include the metadata includes populating the file to include a field for a checksum hash.

12. The method of claim 1, wherein populating the file to include the metadata includes populating the file to include a field for matrix density data.

13. The method of claim 1, wherein populating the file to include the metadata includes populating the file to include a field for compiler data.

14. The method of claim 1, wherein populating the file to include the metadata includes populating the file to include a field for a compression method.

15. The method of claim 1, wherein populating the file to include the metadata includes populating the file to include a corresponding field for all of a QBM name, a QBM format, and a QBM type, and wherein the metadata includes a corresponding field for a cryptographic algorithm, a digital signature, a checksum algorithm, a checksum hash, a density value, a compiler data, and a compression method.

16. One or more hardware storage devices that store instructions that are executable by one or more processors of a computer system to cause the computer system to:

access a quadratic binary model (QBM) problem instance comprising a defined objective function;

compile the QBM problem instance, resulting in consolidation of the following into a composite data structure: (i) the defined objective function, (ii) a constraint for the QBM problem instance defined by the objective function, (iii) a variable for the QBM problem instance defined by the objective function, and (iv) a coefficient for the variable of the defined objective function, wherein the composite data structure is a single symmetric matrix;

generate a file that is structured in accordance with a standardized container file format, wherein the standardized container file format is structured to accommodate a payload, which includes the single symmetric matrix, and wherein the standardized container file format defines a schema that specifies one or more fields for compiled QBM problem instance data, one or more fields for QBM problem instance data, and fields for metadata describing how the payload is to be parsed and interpreted, such that the file is structured, in accordance with the standardized container file format, to include the metadata and the payload and such that the metadata within the file provides context on how to solve the QBM problem instance that is described in the payload;

populate the file by (i) populating the one or more fields for the compiled QBM problem instance data with the composite data structure, (ii) populating the one or more fields for the QBM problem instance data with metadata describing the composite data structure, (iii) the payload, and (iv) the metadata; and transmit the file to a vendor quantum annealer node.

17. A computer system comprising:

one or more processors; and one or more hardware storage devices that store instructions that are executable by the one or more processors to cause the computer system to:

access a quadratic binary model (QBM) problem instance comprising a defined objective function;

compile the QBM problem instance, resulting in consolidation of the following into a composite data structure: (i) the defined objective function, (ii) a constraint for the QBM problem instance defined by the objective function, (iii) a variable for the QBM problem instance defined by the objective function, and (iv) a coefficient for the variable of the defined objective function, wherein the composite data structure is a single symmetric matrix;

generate a file that is structured in accordance with a standardized container file format, wherein the standardized container file format is structured to accommodate a payload, which includes the single symmetric matrix, and wherein the standardized container file format defines a schema that specifies one or more fields for compiled QBM problem instance data, one or more fields for QBM problem instance data, and fields for metadata describing how the payload is to be parsed and interpreted, such that the file is structured, in accordance with the standardized container file format, to include the metadata and the payload and such that the metadata within the file provides context on how to solve the QBM problem instance that is described in the payload;

populate the file by (i) populating the one or more fields for the compiled QBM problem instance data with the composite data structure, (ii) populating the one or more fields for the QBM problem instance data with metadata describing the composite data structure, (iii) the payload, and (iv) the metadata; and transmit the file to a vendor quantum annealer node.

* * * * *